United States Patent
Vankamamidi et al.

(10) Patent No.: US 9,959,054 B1
(45) Date of Patent: May 1, 2018

(54) LOG CLEANING AND TIERING IN A LOG-BASED DATA STORAGE SYSTEM

(71) Applicant: EMC IP Holding Company LLC, Hopkinton, MA (US)

(72) Inventors: Vamsi Vankamamidi, Brooklyn, NY (US); Richard P. Ruef, Santa Cruz, CA (US); Steven Morley, Mendon, MA (US); Ryan Gadsby, Westwood, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 93 days.

(21) Appl. No.: 14/984,060

(22) Filed: Dec. 30, 2015

(51) Int. Cl.
*G06F 3/06* (2006.01)
*G06F 12/0868* (2016.01)

(52) U.S. Cl.
CPC ............ *G06F 3/061* (2013.01); *G06F 3/0655* (2013.01); *G06F 3/0689* (2013.01); *G06F 12/0868* (2013.01)

(58) Field of Classification Search
CPC ...... G06F 3/0608; G06F 3/061; G06F 3/0644; G06F 3/0655; G06F 3/067; G06F 3/0683; G06F 3/0689; G06F 12/0868; G06F 12/0871; G06F 12/0891; G06F 12/121; G06F 12/128
USPC .......... 707/689, 693, 813; 711/113, 114, 133
See application file for complete search history.

(56) References Cited

U.S. PATENT DOCUMENTS

| | | | |
|---|---|---|---|
| 6,611,852 B1* | 8/2003 | Morley | G06F 3/0601 |
| 8,972,694 B1* | 3/2015 | Dolan | G06F 13/28 |
| | | | 711/170 |
| 2014/0040205 A1 | 2/2014 | Cometto, et al. | |
| 2015/0227316 A1 | 8/2015 | Warfield et al. | |
| 2015/0277768 A1 | 10/2015 | Zhou et al. | |
| 2016/0070492 A1* | 3/2016 | Cherubini | G06F 3/0619 |
| | | | 711/114 |
| 2016/0085469 A1 | 3/2016 | Cherubini et al. | |
| 2016/0085696 A1 | 3/2016 | Chiu et al. | |
| 2016/0259586 A1 | 9/2016 | Tylik et al. | |

* cited by examiner

*Primary Examiner* — Gary Portka
(74) *Attorney, Agent, or Firm* — BainwoodHuang

(57) ABSTRACT

A technique is directed to cleaning a log structure. The technique involves identifying extents (e.g., a contiguous segment of 8 MB) to reclaim from a first storage tier of a set of storage tiers containing the log structure. The technique further involves performing a tier selection operation to select a target storage tier from the set of storage tiers based on a utilization measure of the log structure. The technique further involves, after identifying the extents to reclaim and performing the tier selection operation, storing data from the identified extents into a new extent of the target storage tier and freeing the identified extents. Such a technique combines log cleaning and tiering into a single operation thus placing less stress on storage devices (e.g., less wear on flash memory, etc.), consuming fewer system resources, and providing better performance.

21 Claims, 6 Drawing Sheets

LOG CLEANING AND TIERING IN A LOG-BASED DATA STORAGE SYSTEM

BACKGROUND

In contrast to traditional random-access data storage systems that write data to random-access storage structures, a conventional log-structured data storage system writes data into a sequential structure called a log which is stored in non-volatile memory. That is, the log is divided into a series of segments of equal size and, when the log-structured data storage system receives enough data to write a full segment, the log-structured data storage system writes that data into the next unoccupied segment. If any portion of that data had been written to an earlier-written segment in the series, the log-structured data storage system invalidates that portion of data in the earlier-written segment.

If all of the portions of data in an earlier-written segment become invalidated, the log-structured data storage system considers that earlier-written segment available for reuse. Additionally, the log-structured data storage system proactively consolidates valid data from partially-used segments (i.e., segments holding some valid portions of data and some invalidated portions of data) and stores the consolidated valid data in new segments thus freeing those partially-used segments for reuse.

Once the log-structured data storage system has written data to all of the segments in the log, the log-structured data storage system wraps around to the beginning of the series. The log-structured data storage system then writes data to the earlier-used segments which are now available for reuse.

SUMMARY

Suppose that the log-structured data storage system is provisioned with tiered storage, e.g., a fast storage tier of flash memory to store data which is accessed often (i.e., "hot data") and a slow storage tier of magnetic disk drives to store data which is accessed infrequently (i.e., "cold data"). As the log-structured data storage system fills the fast storage tier and the slow storage tier with data, the log-structured data storage system must proactively consolidate the data within each storage tier to make earlier-written segments available for reuse. Accordingly, the log-structured data storage system consolidates data from partially-used segments of the fast storage tier into new segments of the fast storage tier. Likewise, the log-structured data storage system consolidates data from partially-used segments of the slow storage tier into new segments of the slow storage tier.

Moreover, the log-structured data storage system may evict data from the fast storage tier into the slow storage tier if that data has "cooled off" over time (i.e., if that data is no longer accessed frequently). Similarly, the log-structured data storage system may promote data from the slow storage tier to the fast storage tier if that data has "heated up" over time (i.e., if that data becomes heavily accessed).

Unfortunately, there are deficiencies to the above-described log-structured data storage system. In particular, the separate processes of consolidating data from partially-used segments within each storage tier and evicting/promoting data between storage tiers places unnecessary stress on the log-structured data storage system and is wasteful. That is, independently (i) consolidating data within the fast storage tier, (ii) consolidating data within the slow storage tier, and (iii) evicting/promoting data between storage tiers imposes excess input/output (I/O) stress on these tiers and consumes a large amount of other resources (e.g., processor cycles, data path bandwidth, lock contention, etc.). Such inefficiencies may even be more pronounced if the log-structured data storage system is provisioned with more than two storage tiers, e.g., a fastest storage tier of flash memory, a medium storage tier of high speed magnetic disk drives, and a slowest storage tier of legacy magnetic disk drives.

In contrast to the above-described conventional log-structured data storage system, improved techniques are directed to cleaning a log structure (i.e., consolidating data from partially-used extents to make extents available for reuse) where log cleaning and tiering are combined into a single operation. That is, instead of moving the data twice (i.e., once for log cleaning and again for tiering), the data is moved just once to accomplish both log cleaning and tiering. Such operation puts less stress on storage devices (e.g., less wear on flash memory, etc.) and consumes fewer system resources. Accordingly, the system as a whole operates more efficiently and enjoys better performance.

One embodiment is directed to a computer-implemented method of cleaning a log structure. The method includes identifying extents (e.g., 8 MB segments of contiguous storage) to reclaim from a first storage tier of a set of storage tiers containing the log structure. The method further includes performing a tier selection operation to select a target storage tier from the set of storage tiers based on a utilization measure of the log structure. The method further includes, after identifying the extents to reclaim and performing the tier selection operation, storing data from the identified extents into a new extent of the target storage tier and freeing the identified extents.

In some arrangements, performing the tier selection operation to select the target storage tier includes choosing, as the target storage tier, one of the first storage tier and a second storage tier that is different from the first storage tier, based on a utilization measure of the first storage tier. Such a measure can be maintained by a mapper circuit which manages various mappings, e.g., exports logical storage to a namespace, maps the namespace to different tiers, interacts with a RAID (Redundant Array of Independent Drives) backend, etc.

In some arrangements, the utilization measure of the first storage tier is a fullness value that quantifies a degree of fullness of the first storage tier. In these arrangements, choosing, as the target storage tier, one of the first storage tier and the second storage tier includes performing a comparison operation between (i) the fullness value that quantifies the degree of fullness of the first storage tier and (ii) a predefined threshold. Choosing further includes selecting the first storage tier as the target storage tier when the fullness value is less than the predefined threshold, and the second storage tier as the target storage tier when the fullness value is greater than the predefined threshold.

In some arrangements, the first storage tier includes a set of first storage devices providing first data access times. In these arrangements, the second storage tier includes a set of second storage devices providing second data access times that are slower than the first data access times.

In some arrangements, identifying the extents to reclaim includes identifying, as the extents to reclaim, storage segments of the first storage tier which are less than 100 percent utilized. Along these lines, such identification may involve picking, as the storage segments of the first storage tier which are less than 100 percent utilized, storage segments of the first storage tier which are less than 50 percent utilized and least recently accessed among other storage segments of the first storage tier.

In some arrangements, a cleaning matrix structure classifies each storage segment of the first storage tier based on utilization and how long ago that storage segment was accessed relative to other storage segments of the first storage tier. In these arrangements, picking the storage segments of the first storage tier which are less than 50 percent utilized and least recently accessed includes accessing the cleaning matrix structure to pick the storage segments of the first storage tier which are less than 50 percent utilized and least recently accessed. Other levels of utilization are suitable for use as well.

In some arrangements, the first storage tier includes a set of first storage devices providing first data access times, and the target storage tier includes a set of second storage devices providing second data access times that are slower than the first data access times. In these arrangements, storing data from the identified extents into the new extent of the target storage tier includes copying the data from storage segments of the set of first storage devices to a free storage segment of the set of second storage devices providing the second data access times that are slower than the first data access times.

In other arrangements, the first storage tier includes a set of first storage devices providing first data access times, and the target storage tier includes a set of second storage devices providing second data access times that are slower than the first data access times. In these arrangements, storing data from the identified extents into the new extent of the target storage tier includes copying the data from storage segments of the set of first storage devices to a free storage segment of the set of second storage devices providing the second data access times that are faster than the first data access times.

In some arrangements, the log structure is constructed and arranged to store host data on behalf of a set of host computers. In these arrangements, storing the data from the identified extents into the new extent of the target storage tier and freeing the identified extents are performed as a background service which is secondary to a primary service of writing host data into and reading host data from the log structure on behalf of the set of host computers.

Another embodiment is directed to a computer program product having a non-transitory computer readable medium which stores a set of instructions to clean a log structure. The set of instructions, when carried out by computerized circuitry, causes the computerized circuitry to perform a method of:
(A) identifying used extents to reclaim for reuse from a first storage tier of a set of storage tiers containing the log structure;
(B) performing a tier selection operation to select a target storage tier from the set of storage tiers based on a utilization measure of the log structure; and
(C) after identifying the used extents to reclaim and performing the tier selection operation, storing data from the identified used extents into a new extent of the target storage tier and freeing the used identified extents for reuse.

Yet another embodiment is directed to data storage equipment which includes a set of storage tiers containing a log structure, memory, and control circuitry coupled to the set of storage tiers and the memory. The memory stores instructions which, when carried out by the control circuitry, cause the control circuitry to:
(A) identify extents to reclaim from a first storage tier of the set of storage tiers containing the log structure,
(B) perform a tier selection operation to select a target storage tier from the set of storage tiers based on a utilization measure of the log structure, and
(C) after identifying the extents to reclaim and performing the tier selection operation, store data from the identified extents into a new extent of the target storage tier and free the identified extents to clean the log structure.

It should be understood that, in the cloud context, at least some of electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in combining log cleaning and tiering into a single operation.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to cleaning a log structure where log cleaning and tiering are combined into a single operation. That is, instead of moving the data twice (i.e., a first time for log cleaning and a second time for tiering), the data is moved just once to simultaneously accomplish log cleaning and tiering. Such operation places less stress on storage devices (e.g., less wear on flash memory, etc.) and consumes fewer system resources. As a result, the system as a whole operates more efficiently and enjoys better performance.

Figure 1:
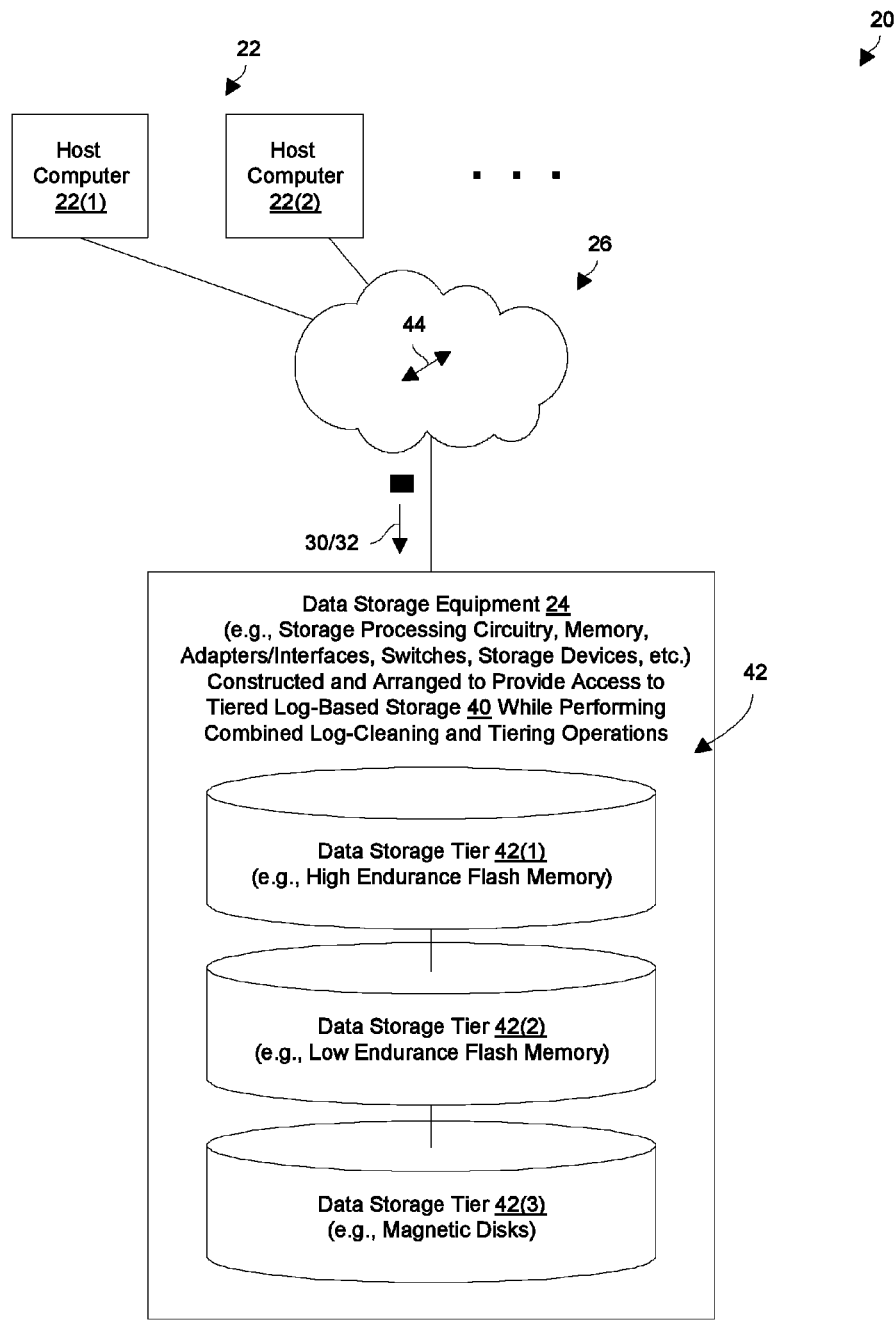
FIG. 1 is a block diagram of a data storage environment which combines log cleaning and tiering into a single operation.

FIG. 1 shows a data storage environment 20 in which log cleaning and tiering are combined into a single operation. The data storage environment 20 includes host computers 22(1), 22(2), . . . (collectively, host computers 22), data storage equipment 24, and a communications medium 26.

Each host computer 22 is constructed and arranged to perform useful work. For example, a host computer 22 may operate as a web server, a file server, an email server, an enterprise server, and so on, which provides I/O requests 30 (e.g., small computer system interface or SCSI commands) to the data storage equipment 24 to write host data 32 into and read host data 32 from the data storage equipment 24.

The data storage equipment 24 includes electronic circuitry for storing the host data 32 on behalf of the host computers 22. The electronic circuitry may include one or more physical storage processors, data movers, director boards, blades, I/O modules, storage drive controllers, switches, other hardware, combinations thereof, and so on. The electronic circuitry is constructed and arranged to process the I/O requests 30 from the host computers 22 by robustly and reliably storing the host data 32 into and loading the host data from log-based storage (or simply a log) 40 contained within data storage tiers 42(1), 42(2), 42(3) (collectively, data storage tiers 42).

Each data storage tier 42 provides a different set of data storage effects (e.g., higher/lower endurance, faster/slower access, higher/lower density, higher/lower cost, etc.). Additionally, each particular data storage tier 42 includes the same type of media to provide the same performance and wear characteristics within that particular tier 42.

Along these lines, the data storage tier 42(1) may include high endurance flash memory (e.g., single-level cell (SLC) NAND flash memory) which provides very fast access to data (i.e., fast write operations, fast read operations, etc.) as well as a large number of program-erase cycles (i.e., long life). Additionally, the data storage tier 42(2) may include lower endurance flash memory which again provides very fast access to data, but which is able to withstand relatively fewer program-erase cycles. Furthermore, the data storage tier 42(3) may include magnetic disk drive memory which is slower than both of the flash memory tiers.

Other data storage tier configurations are suitable for use as well. For example, in a different arrangement, the data storage tier 42(1) may include flash memory for very fast access to data. Additionally, in this arrangement, the data storage tier 42(2) may include high speed magnetic disk drives which provide moderately fast access to data. Furthermore, the data storage tier 42(3) may include legacy magnetic disk drives which provide relatively slow access to data.

It should be understood that other numbers of storage tiers 42 are possible (e.g., two, four, etc.). Additionally, various types of memory are suitable for forming the different storage tiers 42 (e.g., high endurance solid state drives, lower endurance solid state drives, serial attached SCSI (SAS) drives, serial ATA drives, near line SAS drives, etc.).

The communications medium 26 is constructed and arranged to connect the various components of the data storage environment 20 together to enable these components to exchange electronic signals 44 (e.g., see the double arrow 44). At least a portion of the communications medium 26 is illustrated as a cloud to indicate that the communications medium 26 is capable of having a variety of different topologies including backbone, hub-and-spoke, loop, irregular, combinations thereof, and so on. Along these lines, the communications medium 26 may include copper-based data communications devices and cabling, fiber optic devices and cabling, wireless devices, combinations thereof, etc. Furthermore, the communications medium 26 is capable of supporting LAN-based communications, SAN-based communications, cellular communications, WAN-based communications, distributed infrastructure communications, other topologies, combinations thereof, etc.

During operation, the data storage equipment 24 provides access to the log 40 while performing combined log cleaning and tiering operations. That is, the log 40 is divided into a series of extents (or segments) of equal size (e.g., 4 MB, 8 MB, 16 MB, etc.). As the data storage equipment 24 receives host data 32 to write to the log 40, the data storage equipment 24 writes that host data 32 into the next unoccupied extent or extents in the series. If any portion of the host data 32 had been written to an earlier-written extent in the series, the data storage equipment 24 invalidates that portion of host data 32 in the earlier-written extent.

Additionally, if all of the portions of host data 32 in an earlier-written extent become invalidated, the data storage equipment 24 considers that earlier-written extent available for reuse. Such operation is considered to be natural "self-cleaning" of the log 40.

Furthermore, the data storage equipment 24 proactively consolidates data from partially-used extents (i.e., extents holding invalidated portions of data) and stores the consolidated data in new extents thus making those partially-used extents available for reuse (i.e., proactive cleaning). During such consolidation, the data storage equipment 24 decides whether to move the host data 32 into the same data storage tier 42 or a different data storage tier (i.e., tiering). Accordingly, the host data 32 is moved just once to accomplish both log cleaning and tiering instead of moving the host data 32 twice (i.e., once for log cleaning and again for tiering). As a result, there are fewer I/O operations performed on the storage 40 compared to separately cleaning and tiering, thus placing less stress on storage devices (e.g., less wear on flash memory, etc.) and consuming fewer system resources. Consequently, the data storage equipment 24 operates more efficiently and enjoys enhanced performance.

Once the data storage equipment 24 has written data to all of the extents in the log 40, the data storage equipment 24 wraps around to the beginning of the series. The data storage equipment 24 then writes data to the earlier-used extents which are now available for reuse. Further details will now be provided with reference to FIG. 2.

Figure 2:
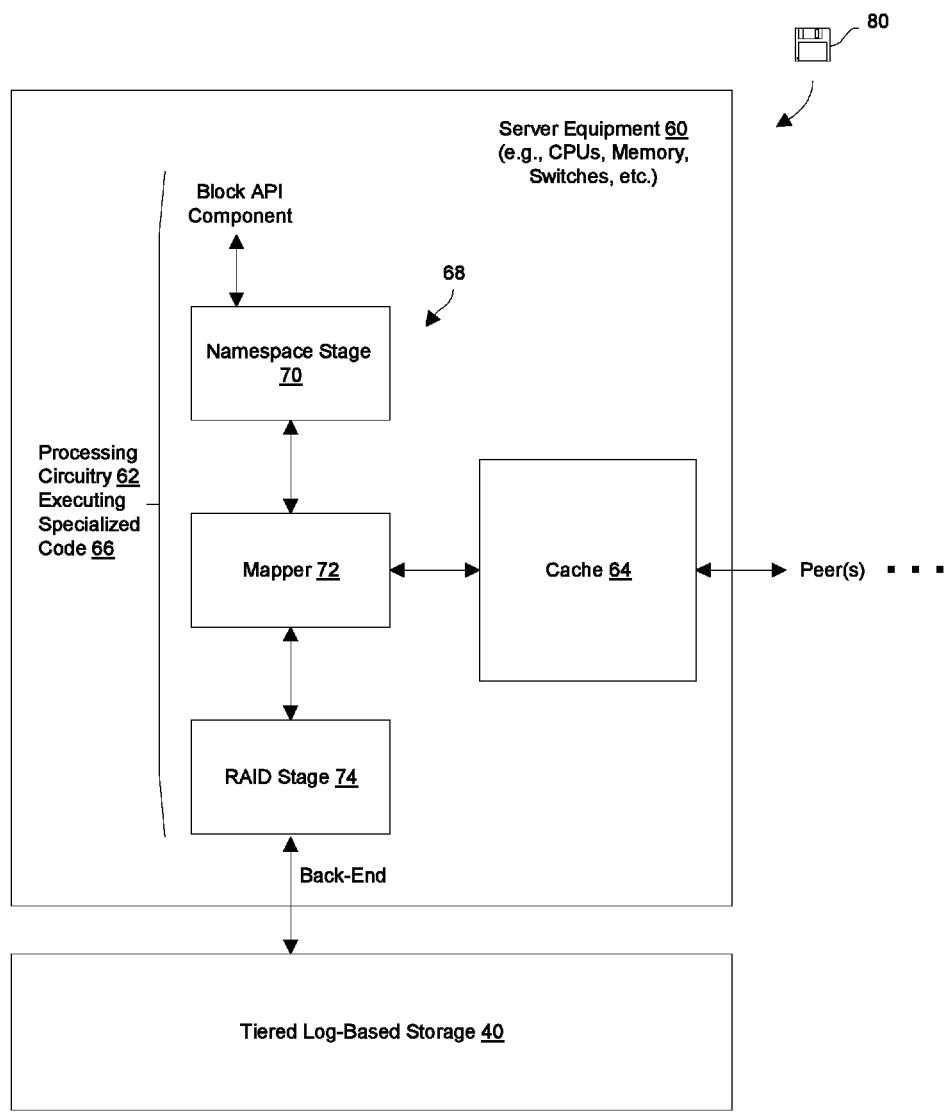
FIG. 2 is a block diagram of particular details of data storage equipment of the data storage environment of FIG. 1.

FIG. 2 shows particular details of server equipment 60 (i.e., CPUs, memory, switches, etc.) which forms at least part of the data storage equipment 24 (also see FIG. 1). The server equipment (or simply server) 60 includes, among other things, processing circuitry 62 and a cache 64. The processing circuitry 62 is provisioned to execute specialized code 66 to form specialized data path stages 68, namely, a namespace stage 70, a mapper 72, and a RAID stage 74 which are disposed between higher level host stages and the tiered log-based storage 40 (also see FIG. 1).

The namespace stage 70 implements file semantics and supports access by file protocols such as Network File System (NFS) and Common Internet File System (CIFS), as well as block protocols through a block API component. In some arrangements, the namespace stage 70 exports a VFS (Virtual File System) like interface. It should be understood that the namespace stage 70 maintains a variety of host objects (e.g., file systems, files, logical units of storage or LUNs, etc.) and object-related metadata such as quality of service (QoS) metrics, etc. As shown in FIG. 2, the namespace stage 70 communicates with the mapper 72, e.g., to obtain logical-to-physical address mappings via an API of the mapper 72.

The mapper 72 exports logical storage to the namespace stage 70 and maps that logical storage to the different storage tiers 42 of the tiered log-based storage 40 (also see FIG. 1). The mapper 72 utilizes the cache 64 to perform various operations (e.g., transactions, clustering, data and metadata caching, etc.). As further shown in FIG. 2, the mapper 72 communicates with the RAID stage 74 for back-end operations, e.g., back-end I/O's, rebuild operations, etc.

The RAID stage 74 provides access to the back-end. That is, the RAID stage 74 operates as an interface to physical storage by binding storage devices into RAID groups, and exporting the physical storage to the mapper 72 as different tiers 42 of storage (also see FIG. 1). Along these lines, the RAID stage 74 issues I/O's to the back-end storage devices and handles storage device errors. The RAID stage 74 also performs rebuilds (e.g., data reconstruction on spare storage devices). In some arrangements, the RAID stage 74 receives, from the mapper 72, extents (or segments) that are the same size as that of stripes (or stripe multiples aligned on stripe boundaries) that the RAID stage 74 uses to implement a particular RAID level (e.g., RAID 5, RAID 6, RAID 10, etc.).

The cache 64 provides storage (e.g., DRAM with battery backup, non-volatile storage, etc.) for use by the mapper 72. In particular, the mapper 72 interacts with a transactional memory interface of the cache 64. In some arrangements, information within the cache 64 is mirrored to one or more peer caches 64 of another server 60.

It should be understood that the processing circuitry 62 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 80 is capable of delivering all or portions of the specialized code 66 to the processing circuitry 62. In particular, the computer program product 80 has a non-transitory (or non-volatile) computer readable medium which stores a set of instructions which controls one or more operations of the processing circuitry 62. Examples of suitable computer readable storage media include tangible articles of manufacture and apparatus which store instructions in a non-volatile manner such as CD-ROM, flash memory, disk memory, tape memory, and the like.

During operation, while the mapper 72 provides mapping services to the namespace stage 70 and consumes RAID services from the RAID stage 74 to write data to the tiered log-based storage 40. Along these lines, the mapper 72 maps virtual extents to physical extents and vice versa. Additionally, the mapper 72 cleans the tiered log-based storage 40 to free extents within the tiered log-based storage 40 (i.e., make the extents reusable) as well as moves data among the storage tiers 42 (i.e., tiering).

As will be explained in further detail below, the mapper 72 performs cleaning and tiering as a single operation. Such cleaning and tiering may move data from higher tier 42 to a lower tier 42 (i.e., down tiering). In some arrangements, such cleaning and tiering also may move data from a lower tier 42 to a higher tier 42 (i.e., up tiering). Further details will now be provided with reference to FIG. 3.

Figure 3:
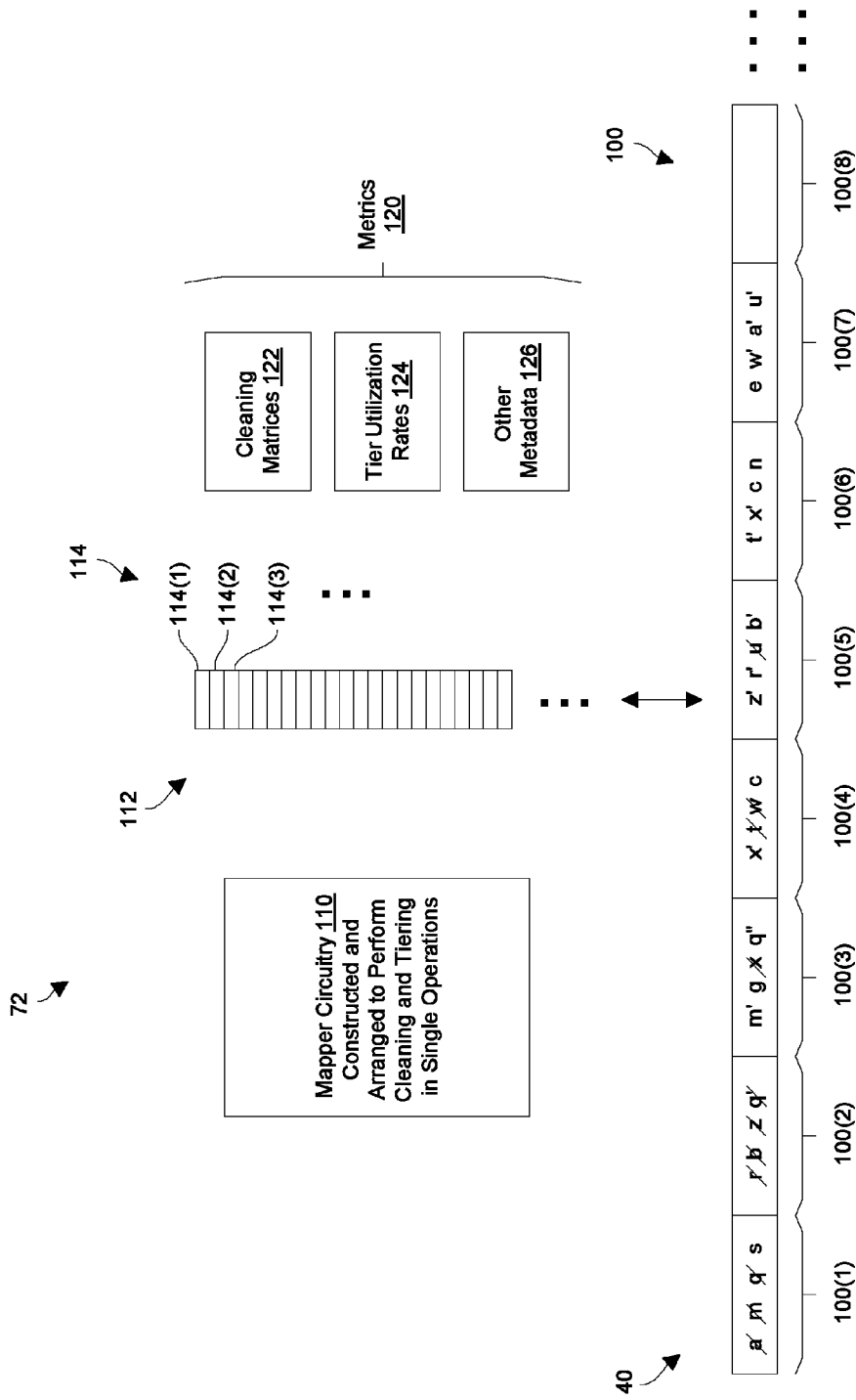
FIG. 3 is a block diagram of other details of the data storage equipment of the data storage environment of FIG. 1.

FIG. 3 shows particular details of the mapper 72 with respect to the tiered log-based storage (or simply log) 40. As shown, the log 40 includes a series of data storage extents 100(1), 100(2), 100(3), 100(4), 100(5), 100(6), 100(7), 100(8), . . . (collectively, extents 100) which is distributed among the various storage tiers 42 of non-volatile memory (also see FIG. 1). Each extent 100 includes multiple blocks for holding data and is of equal size (e.g., 4 MB, 8 MB, 16 MB, etc.).

The mapper 72 includes mapper circuitry 110 which maintains a listing 112 of mapper entries 114(1), 114(2), 114(3), . . . (collectively, mapper entries 114) which correspond to respective extents 100(1), 100(2), 100(3), . . . to map logical addresses to physical storage. That is, mapper entry 114(1) corresponds to extent 100(1), mapper entry 114(2) corresponds to extent 100(2), and so on. In addition to mapping logical addresses to physical addresses (or near physical addresses), the entries 114 include information such as which blocks within the corresponding extents 100 contain valid (or live) data. In some arrangements, the mapper 72 further manages mappings to a virtual address space. Although the listing 112 is illustrated as having a tabular or linear form in FIG. 3 for simplicity, in some arrangements, the listing 112 takes the form of an N-way balanced tree.

The mapper 72 further maintains a set of metrics 120 including a set of cleaning matrices 122, a set of tier utilization rates 124, and other metadata 126. There is a respective cleaning matrix 122 for each storage tier 42 (one being illustrated in FIG. 4) to enable the mapper 72 to efficiently and effectively identify extents 100 based on utilization (i.e., how much of the extents 100 contain valid data) and/or access frequency (i.e., which extents 100 are the most/least frequently used). The tier utilization rates 124 indicate respective measures of utilization for the various storage tiers 42 (i.e., a threshold of free extents 100 per storage tier 42). The other metadata 126 represents other information that the mapper 72 maintains in order to map addresses, and manage the tiered log-based storage 40 (e.g., predefined or default thresholds, the head/tail of the series of extents 100 in each tier 42, heat maps to identify hot blocks within each tier 42 for up tiering, etc.).

The formula for calculating the percent utilization U(E) of a particular extent 100 is shown below as equation (1):

$$U(E) = \frac{\text{number of valid blocks in the extent}}{\text{total number of blocks in the extent}}. \quad (1)$$

The extent utilization U(E) is essentially a measure of fullness of the particular extent 100, i.e., how much of the particular extent 100 currently holds valid data.

Additionally, the write cost in terms of I/O operations can be represented based on the level of utilization of the extents as equation (2):

$$\text{Write Cost} = \frac{2}{1 - U(E)}. \quad (2)$$

Accordingly, the write cost for selecting extents that are 50% utilized (i.e., U(E)=0.50) is four I/O operations (i.e., 2/(1−0.5)=4). Similarly, the write cost for selecting extents that are 75% utilized (i.e., U(E)=0.75) is eight I/O operations (i.e., 2/(1−0.75)=8). A detailed discussion of write costs can be found in a document entitled "The Design and Implementation of a Log-Structured File System", by Mendel Rosenblum and John K. Ousterhout, University of California at Berkeley, 1992, the contents and teachings of which are hereby incorporated by reference in their entirety.

Furthermore, the formula for calculating the percent utilization U(T) of an entire storage tier 42 is shown below as equation (3):

$$U(T) = \frac{\text{number of used extents in the tier}}{\text{total number of extents in the tier}}. \quad (3)$$

The tier utilization U(T) is essentially a measure of fullness of the particular storage tier 42, i.e., how many extents 100 of the particular storage tier 42 currently hold valid data.

During operation, the mapper circuitry 110 receives data to write to the log 40 and, when enough data is received to fill an entire extent 100 (e.g., 8 MB), the mapper circuitry 110 writes that data to a free extent 100. A free extent 100 may be completely empty (e.g., if the storage is new or zeroed out). Also, the free extent 100 may be a previously used extent 100 in which all of the earlier-written data has been invalidated.

Further details of how the mapper circuitry 110 maintains the log 40 will be provided via an example. Initially, suppose that the mapper circuitry 110 writes data (a), (m), (q), and (s) to the extent 100(1) which is the first extent 100 in the log 40, i.e., the first extent in the series.

Next, suppose that the mapper circuitry 110 writes data (r), (b), (z), and (q') to the extent 100(2). Here, the data (q') represents writing a copy of the original data (q) that was written to extent 100(1). Accordingly, the mapper circuitry 110 invalidates the data (q) in extent 100(1) (illustrated by the strikethrough of (q) in the extent 100(1) in FIG. 3) since a more-recent copy of the data (q') now resides in extent 100(2).

Further suppose that the mapper circuitry 110 writes data (m'), (g), (x), and (q") to the extent 100(3). Here, the data (m') represents writing a copy of the original data (m).

As a result, the mapper circuitry 110 invalidates the data (m) in extent 100(1) (illustrated by the strikethrough of (m) in the extent 100 (1) in FIG. 3) since a more-recent copy of the data (m') now resides in extent 100(3). Likewise, the mapper circuitry 110 invalidates the data (q') in extent 100(2) (illustrated by the strikethrough of (q') in the extent 100(2) in FIG. 3) since a new copy of the data (q") now resides in extent 100(3).

This process of serially filling new extents 100 in the log 40 continues as the mapper circuitry 110 receives more data to write to the log 40. Eventually, in this example, all of the data within the extent 100(2) is invalidated. That is, the extent 100(2) is now 0% utilized (also see equation (1) above). Accordingly, the mapper circuitry 110 considers the extent 100(2) available for reuse due to self-cleaning.

Further, by way of example and as is shown in FIG. 3, extent 100(1) is 25% utilized (i.e., one quarter of the data is valid). Additionally, extent 100(3) and extent 100(5) are 75% utilized (i.e., three quarters of the data is valid). Furthermore, extent 100(4) is 50% utilized (i.e., half of the data is valid). Also, extent 100(6) and extent 100(7) are 100% utilized (i.e., all of the data is valid).

Extent 100(8) is 0% utilized because it is empty. Further details will now be provided with reference to FIG. 4.

Figure 4:
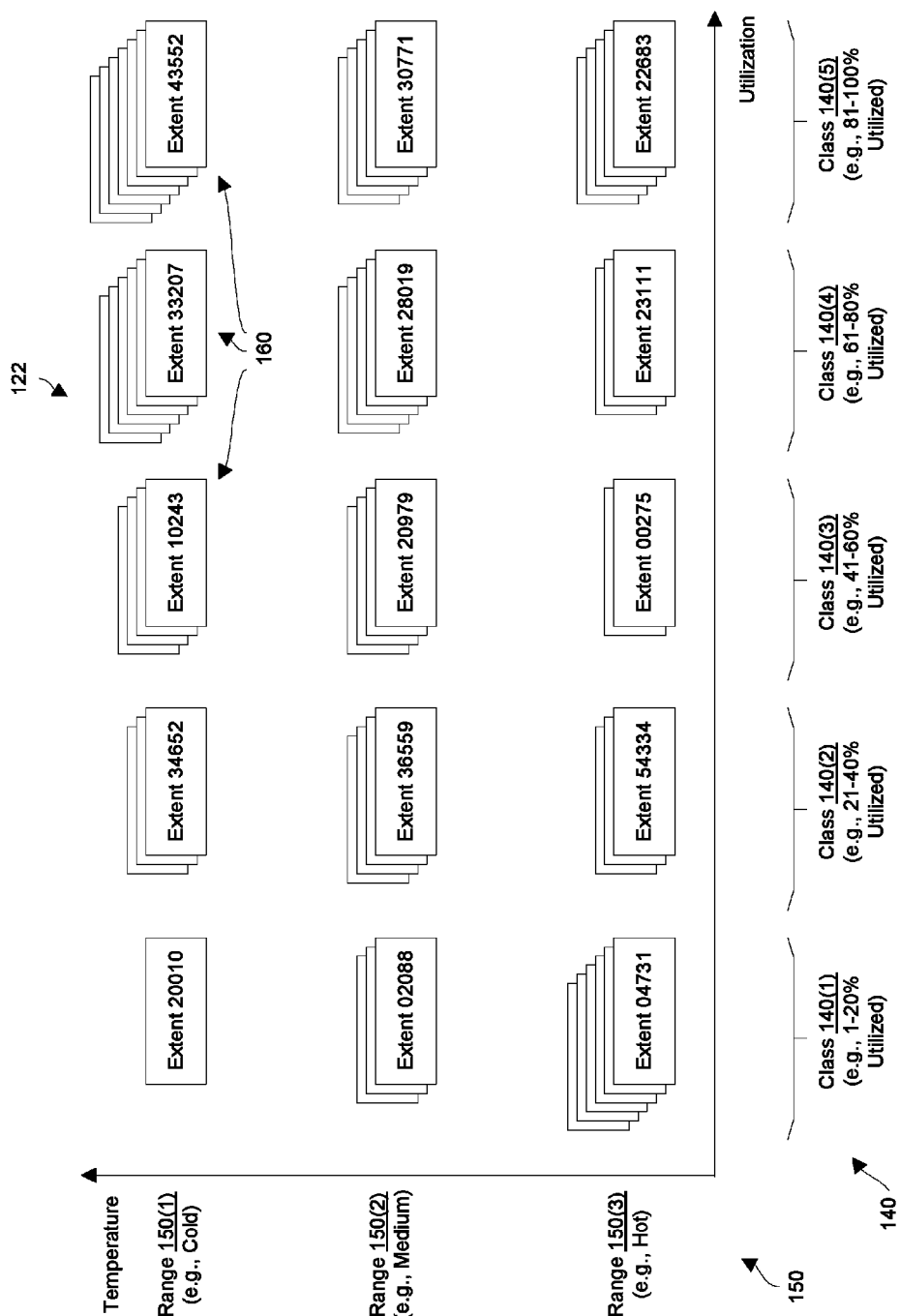
FIG. 4 is a block diagram illustrating particular details of a cleaning matrix structure which is managed and maintained by the data storage equipment of the data storage environment of FIG. 1.

FIG. 4 shows particular details of a cleaning matrix 122 for a particular storage tier 42 of the data storage equipment 24 (also see FIG. 1). The mapper circuitry 110 of the mapper 72 (FIG. 3) manages and maintains the cleaning matrix 122, and uses the cleaning matrix 122 to identify extents 100 for proactive cleaning and down tiering. Generally, the cleaning matrix 122 is a multi-dimensional data structure that identifies the extents 100 of the log 40 based on percentage utilization (X axis) and temperature (Y axis) (equation (1) above). In particular, the cleaning matrix 122 defines utilization classes (or buckets) 140(1), 140(2), 140(3), 140(4), 140(5) (collectively, classes 140). Additionally, the cleaning matrix 122 further defines temperature ranges 150(1), 150(2), 150(3) (collectively, ranges 150). It should be understood that the number of classes 140 in the cleaning matrix 122 may vary (e.g., two, three, four, six, eight, 10, 20, etc.) and/or the number of ranges 150 in the cleaning matrix 122 may vary (e.g., two, four, five, etc.).

The entries 160 of the cleaning matrix 122 identify respective extents 100 of a particular storage tier 42 (also see FIGS. 1 and 3). In some arrangements, the cleaning matrix entries 160 are different than the entries 114 of the mapper list 112. In other arrangements, the cleaning matrix entries 160 are the same as the entries 114 in the mapper list 112.

As mentioned above, the mapper circuitry 110 organizes the cleaning matrix entries 160 based on utilization and temperature. To this end, the entries 160 closer to the left identify less utilized extents 100. That is, the entries 160 at the far left identify extents 100 that are barely utilized, e.g., the entries 160 of the class 140(1) identify extents 100 that hold between 1% and 20% valid data (the term "1%" is intended to mean greater than 0%). In contrast, the entries 160 at the far right identify extents 100 that are very utilized, e.g., the entries 160 of the class 140(5) identify extents 100 that hold between 81% and 100% valid data.

Additionally, the entries 160 closer to the top identify less frequently accessed extents 100. That is, the entries 160 at the very top identify extents 100 that are very cold, e.g., perhaps not accessed for a very long period of time such as more than a day. In contrast, the entries 160 at the very bottom identify extents 100 that are hot, e.g., perhaps accessed three times or more within the last day.

At this point, it should be understood that a cold extent 100 with low utilization makes a better candidate for proactive cleaning than a hot extent 100 with low utilization because the valid data of the hot extent 100 is more likely to be rewritten thus enabling the hot extent 100 to be self-cleaned. That is, if all of the remaining valid data of the hot extent 100 is written to one or more new extents 100 by simply writing more data to the log 40, the hot extent 100 will then be freed automatically without proactive cleaning.

Accordingly, the mapper circuitry 110 scans for entries 160 along the top of the cleaning matrix 122 and preferably nearer the left to identify the best extent candidates for cleaning. Moreover, if there are no good candidates for cleaning, simple tiering can be performed to free extents 100 in the tiers 42 so that there is always an acceptable amount of available free storage in each tier 42. Particular details of the log cleaning process will be provided shortly with reference to FIG. 5.

Also, it should be understood that, as the mapper 72 processes an I/O request, the mapper 72 updates the cleaning matrix 122. Along these lines, when a free extent 100 is consumed (i.e., when the free extent 100 is written with new data), the mapper circuitry 110 of the mapper 72 updates the cleaning matrix 122 by (i) adding an entry 160 that identifies that extent 100 and (ii) modifying existing entries 160 as necessary (e.g., moving entries 160 if the utilization of the corresponding extents 100 changes, etc.). Diagrammatically, the mapper 72 adds the entry 160 identifying the new extent 100 to the front of a particular cleaning matrix location, namely, the lower righthand location (e.g., see the cleaning matrix entry 160 that identifies "Extent 22683" in FIG. 4). Accordingly, the cleaning matrix 122 can be further viewed as having a third dimension (i.e., into or out of the page) representing relative time for the entries 160 (i.e., the Z axis) at a particular cleaning matrix location where the newer entries 160 are at the front of the cleaning matrix 122, and the older entries are at the back of the cleaning matrix 122.

Furthermore, when data is read from an extent 100, the mapper 72 may update metadata of the cleaning matrix entry 160 that represents that extent 100 to indicate that the temperature of that extent 100 has increased. Other activities may prompt the mapper 72 to further adjust the cleaning matrix 122.

In some arrangements, the entries 160 are linked-list structures that enable the mapper 72 to traverse (i.e., navigate among the entries 160) in order to identify the entries 160 at the head or tail of a particular utilization class 140 and/or temperature range 150. Accordingly, the mapper 72 is able to effectively identify extents 100 for cleaning based on utilization class 140 and/or temperature range 150 (e.g., such as finding the oldest and least recently accessed extent 100 from the lowest utilization class 140). Additionally, the mapper 72 is able to add/move entries 160 as the various attributes of the extents 100 change (e.g., utilization, temperature, etc.).

Based on the above-provided description of the mapper 72, it should be understood that there is a natural trend in the cleaning matrix 122 where extents 100 identified by entries 160 in the upper left hand corner tend to be selected by the mapper 72 for cleaning and reuse. Additionally, extents 100 identified by entries 160 in the bottom right hand corner tend to represent newly written extents 100. Furthermore, the entries 160 tend to migrate from the lower right to the upper left of the cleaning matrix 122 as more data is written to the log 40 over time.

Other cleaning matrix, heat map layouts and segment selection schemes may be suitable for use by the mapper 72 when performing log cleaning and tiering in a single operation. Along these lines, a similar cleaning matrix layout is disclosed in U.S. Pat. No. 6,611,852, entitled "SYSTEM AND METHOD FOR CLEANING A LOG STRUCTURE", the contents and teachings of which are hereby incorporated by reference in their entirety. Further details will now be provided with reference to FIG. 5.

Figure 5:
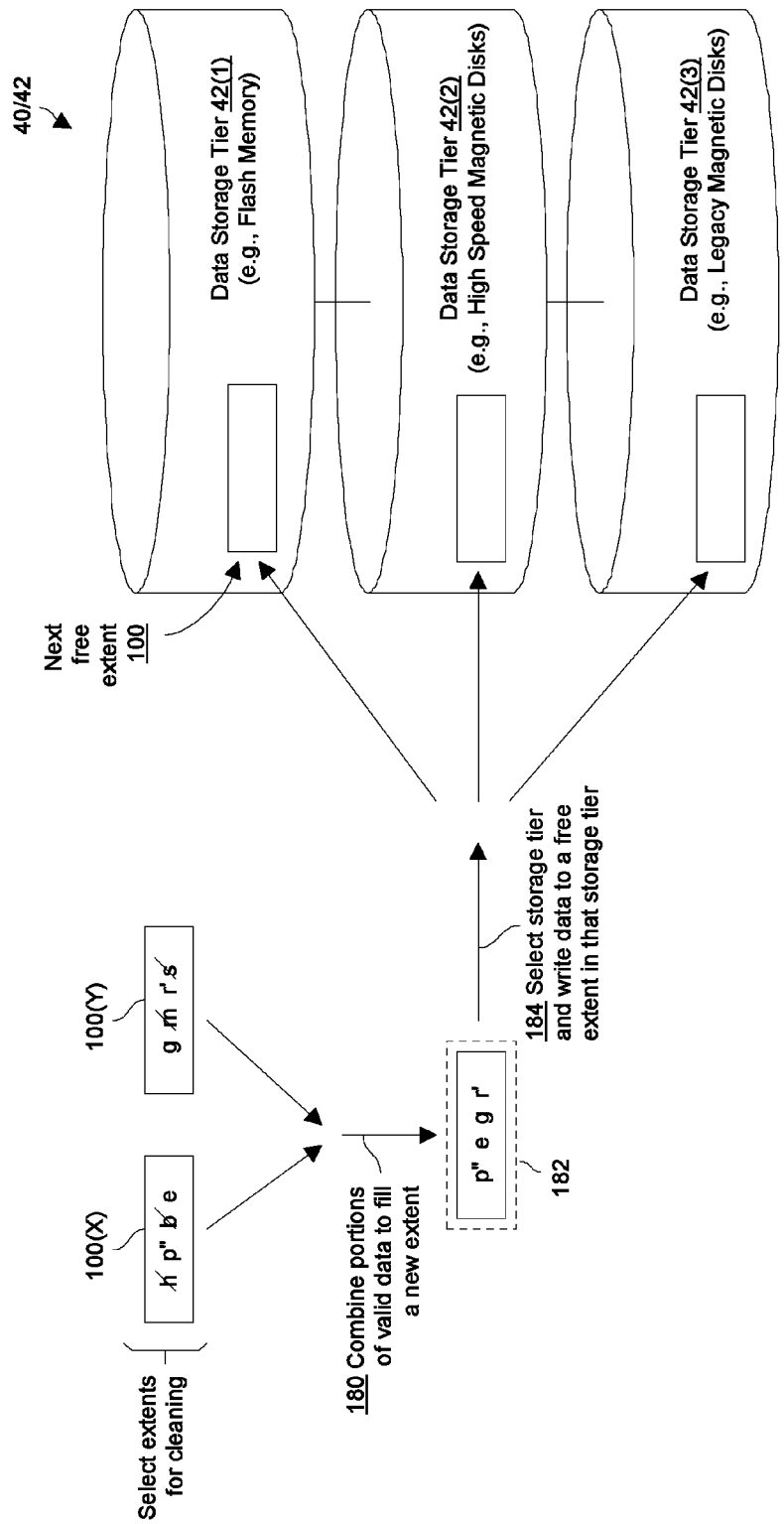
FIG. 5 is a block diagram illustrating particular details of a log cleaning and tiering operation.

FIG. 5 shows particular operational details of the mapper 72 when log cleaning and tiering are performed as a single operation. By way of example, the mapper circuitry 110 of the mapper 72 (FIG. 3) selects two (or more) extents 100(X) and 100(Y) for cleaning from a particular storage tier 42 of the log 40. To this end, the mapper circuitry 112 accesses the cleaning matrix 122 for that storage tier 42 and identifies the two extents 100(X) and 100(Y) by selecting cleaning matrix entries 160 from the upper left of the cleaning matrix 122, i.e., cold extents 100 having low utilization (also see FIG. 4). The mapper circuitry 110 may be constructed and arranged to select extents 100 that satisfy particular criteria such as extents 100 that are 50% or less utilized and that are the least recently accessed within the current storage tier 42 (e.g., see the metadata 126 in FIG. 3). In some arrangements, the cleaning matrix 122 takes the form of an enhanced linked-list structure enabling the mapper 72 to efficiently and effectively traverse the cleaning matrix 122, modify entries 160, add entries 160, delete entries 160, move entries 160, and so on.

As shown in FIG. 5, the extent 100(X) includes data (h), (p"), (b), and (e). The portions of data (p") and (e) are valid (or live) because these portions of data (p") and (e) have been written to the log 40 most recently. On the other hand, the portions of data (h) and (b) are invalid (shown in FIG. 5 by strikethroughs) because the same portions of data (h) and (b) have since been written to another extent 100 of the log 40.

Likewise, the extent 100(Y) includes data (g), (m), (r'), and (s). The portions of data (g) and (r') are valid because these portions of data (g) and (r') have been written to the log 40 most recently. However, the portions of data (m) and (s) are invalid because the same portions of data (m) and (s) have since been written to another extent 100 of the log 40.

To perform log cleaning and tiering as a single operation, the mapper circuitry 110 combines the valid data of the extents 100(X) and 100(Y) to form new contents for writing to the log 40. In particular, the mapper circuitry 110 reads the extent 100(X), reads the extent 100(Y), and generates new contents from the valid portions of data (i.e., data portions (p"), (e), (g), and (r')) for writing to a new extent 100. This data aggregation activity is represented by arrow 180 in FIG. 5. The mapper circuitry 110 may temporarily store this combined data in a buffer 182 (e.g., cache memory) prior to writing this combined data to the log 40.

A similar process of reading data from segments to form a new segment is disclosed in U.S. Pat. No. 6,611,852. Such a disclosed process is suitable for forming the data in the buffer 182.

In some arrangements, the data portions (e.g., blocks) are moved in such a way as to pack the data portions together and maintain the relative ordering of the data portions.

Such operation maintains both temporal locality and, in contrast to random writes, spatial locality if such spatial locality already exists.

Next, the mapper circuitry 110 selects a free extent 100 from the log 40. Along these lines, the mapper circuitry 110 evaluates the particular storage tier 42 that contains the extents 100(X) and 100(Y) to determine whether to write the combined data to the particular storage tier 42 or to a different storage tier 42. To this end, the mapper circuitry 110 determines whether there are enough free extents 100 in the particular storage tier 42, i.e., whether a utilization measure U(T) of the particular storage tier 42 (also see equation (3) above), satisfies a utilization metric 124 for that storage tier 42 (also see FIG. 3). In particular, the mapper circuitry 110 attempts to maintain a certain percentage of free (i.e., available/usable) extents 100 in each storage tier 42 for efficient operation.

If the utilization metric 124 for the current storage tier 42 (e.g., as calculated by equation (3)) indicates that the current storage tier 42 has enough free extents 100 (i.e., the current storage tier 42 is compliant with its utilization requirements), the mapper circuitry 110 selects, as a free extent 100 from the current storage tier 42, the next extent 100 in the series that is available for use. For example, suppose that the current storage tier 42 is required maintain 40% of the extents 100 as free extents 100 (see the other metadata 126 in FIG. 3) and that the current tier utilization is at 58% meaning that 42% of the extents 100 are currently free. Since at least 40% of the extents 100 of the current storage tier 42 are free, the mapper circuitry 110 selects a free extent 100 from the current storage tier 42.

However, if the utilization metric 124 for the current storage tier 42 indicates that the current storage tier 42 does not have enough free extents 100 (e.g., the tier utilization U(T) is above the predefine tier utilization threshold), the mapper circuitry 110 selects a free extent 100 from a different storage tier 42 if possible (e.g., down tiering). For example, the current storage tier 42 may be required maintain 40% of the extents 100 as free extents 100 but the current tier utilization may be at 61% meaning that only 39% of the extents 100 are currently free.

To select a free extent 100 from a different storage tier 42, the mapper circuitry 110 chooses the next extent 100 in the series that is available for use. If a slower storage tier 42 exists and has free extents 100, the mapper circuitry 110 can select the free extent 100 from the slower storage tier 42 (i.e., down tiering) provided that the slower storage tier 42 is currently compliant with its utilization requirements. In some arrangements, it is also possible for the mapper circuitry 110 to select a free extent 100 from a faster storage tier 42 (i.e., up tiering), e.g., if the faster storage tier 42 is underutilized and current storage tier 42 is over utilized, if current storage tier 42 is over utilized and there is no slower storage tier, etc.

Once the mapper circuitry 110 has selected a free extent 100 of the log 40, the combined data is written from the buffer 182 to the free extent 100 of the log 40, and the old data in the extents 100(X) and 100(Y) is invalidated thus freeing the extents 100(X) and 100(Y), i.e., thus making the extents 100(X) and 100(Y) available for reuse. This selection and writing activity is represented by arrow 184 in FIG. 5.

Additionally, the mapper circuitry 110 updates the various metrics 120 (FIG. 3) to reflect the results of the log cleaning and tiering operation. Along these lines, the mapper circuitry 110 updates the cleaning matrix 122 (e.g., by removing the entries 160 identifying extents 100(X) and 100(Y) from the cleaning matrix 122) and the tier utilization rates 124.

It should be understood that the log cleaning and tiering process was described above as combining data from two extents 100(X) and 100(Y) and consuming one free extent 100 by way of example only. Other many-to-one log cleaning and tiering operations are suitable as well such as combining data from three extents 100, four extents 100, etc. into one free extent 100.

Also, it should be understood that such combining may result in extra data, i.e., residual data if the combined data takes up more space than one extent 100. In such situations, the residual data is temporarily maintained for use in another log cleaning and tiering process which consumes a free extent 100 as well as frees up at least one earlier-written extent 100. Such operation continues over time to maintain a healthy log 40 with ample free extents 100 available for reuse. Further details will now be provided with reference to FIG. 6.

Figure 6:
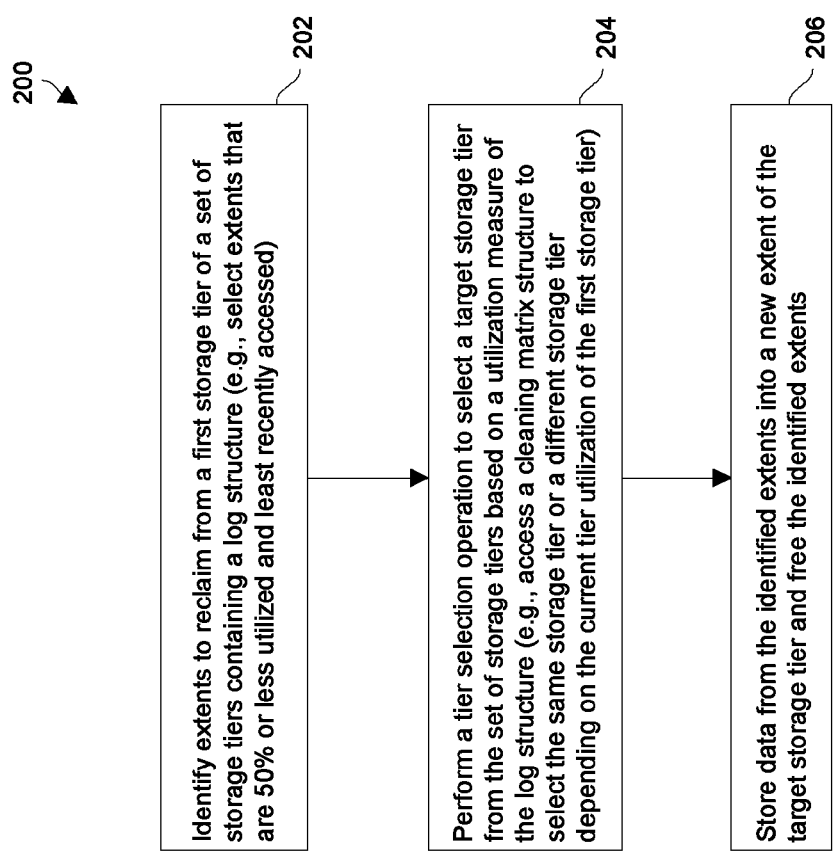
FIG. 6 is a flowchart of a procedure which is performed by the data storage equipment of FIG. 2.

FIG. 6 is a flowchart of a procedure 200 which is performed by the data storage equipment 24 (also see FIG. 1) where log cleaning and tiering are performed as a single operation. Furthermore, such a procedure 200 may be performed as a background service which is secondary to a primary service of writing host data into and reading host data from the log structure on behalf of the set of host computers (e.g., see FIG. 1). Accordingly, there is less wear and consumption of resources vis-à-vis an alternative of independently cleaning a log, and moving data among tiers.

At 202, the data storage equipment 24 identifies extents to reclaim from a first storage tier of a set of storage tiers containing the log structure. For example, the data storage equipment 24 may select, as the extents, storage segments of the first storage tier which are less than 50 percent utilized (e.g., see equation (1)) and least recently accessed (e.g., see the cleaning matrix 122 in FIG. 4).

At 204, the data storage equipment performs a tier selection operation to select a target storage tier from the set of storage tiers based on a utilization measure of the log structure (e.g., see equation (3)). In particular, the data storage equipment 24 may select, as the target storage tier, a second storage tier that is different from the first storage tier based on the current tier utilization U(T) of the first storage tier, i.e., a fullness value that quantifies a degree of fullness of the first storage tier. For example, if the current utilization U(T) of the first storage tier is below the predefined tier utilization threshold, the data storage equipment 24 can select a free extent in the first storage tier. Otherwise, the data storage equipment 24 tries to relocate the data to a free extent of a different storage tier. Such selection may involve accessing a list of map entries to identify the next free extent a particular storage tier (e.g., see FIG. 3).

At 206, after identifying the extents to reclaim and performing the tier selection operation, the data storage equipment stores data from the identified extents into a new extent of the target storage tier and frees the identified extents.

As described above, improved techniques are directed to cleaning a log structure 40 (i.e., consolidating data from partially-used extents 100 to make the extents 100 available for reuse) where log cleaning and tiering are combined into a single operation. That is, instead of moving the data twice (i.e., once for log cleaning and again for tiering), the data is moved just once to accomplish both log cleaning and tiering. Such operation puts less stress on storage devices (e.g., less wear on flash memory, etc.) and consumes fewer system resources. Accordingly, the system as a whole operates more efficiently and enjoys better performance.

One should appreciate that the above-described techniques do not merely consolidate data in an abstract sense. Rather, the disclosed techniques involve advantageously coalescing valid (or live) data from multiple partially-utilized segments of storage into fewer segments while simultaneously tiering that valid data to improve the operation of data storage equipment. Accordingly, there is less wear and less consumption of resources.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage environment 20 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

The above-described techniques combine log cleaning and tiering into a single operation. Such techniques apply to log-based systems having multiple tiers of storage. Instead of moving the data multiple times (e.g., once for log cleaning and again for tiering), the data is moved only once and accomplish both log cleaning and tiering as a single operation. This puts less I/O stress on the storage devices and other resources in the system and consequently helps improve system performance. This also helps reduce wear on flash drives. To implement the techniques several data structures are maintained. In accordance with some arrangements, these include utilization counters per log-stripe to help determine, which log-stripe to select for log cleaning and also heat-map on data in the log-stripe to help determine into which tier log-cleaned data should be written to, and so on. Other data structures such as how busy/utilized different tiers are in the system are also maintained.

In some arrangements, the operation of log cleaning and tiering is offered as an atomic operation in the sense that the valid data within the affected extents 100 are prohibited from being accessed by other means while the extents 100 are being accessed for cleaning and tiering. Along these lines, the data storage equipment 24 employs appropriate mechanisms (e.g., locks, other mechanisms for resolving resource contention, etc.) to protect data coherency.

Additionally, it should be understood that different criteria can be used to perform down tiering and up tiering of data. For example, the above-described cleaning matrix 122 can be used to perform cleaning and down-tiering of extents 100 (also see FIG. 4). However, an alternative mechanism can be used to promote data from a lower tier 42 to a higher tier 42 (i.e., up tiering). Along these lines, the mapping circuitry 110 may employ a specialized data structure to track the temperature (e.g., "heat") of smaller amounts of data (e.g., 64 KB blocks, 8 KB blocks, etc.). In particular, to keep the size of the specialized data structure to a manageable size, only the hottest blocks of data are tracked. Accordingly, a suitable data structure is a sparse array of entries ranked in a least recently used (LRU) arrangement. Here, each entry of this "heat map" structure identifies a recently accessed block, and includes a write counter to count the number of writes to that block, and a read counter to count the number of reads of that block. In some arrangements, a single counter is used to tally writes and reads in a single count. The hottest blocks that are tracked can then be up tiered based on policy (e.g., if the number of accesses is three or greater). Such modifications and enhancements are intended to belong to various embodiments of the disclosure.

What is claimed is:

1. A computer-implemented method of cleaning a log structure, the method comprising:
   identifying a plurality of extents to reclaim from a first storage tier of a set of storage tiers containing the log structure;
   performing a tier selection operation to select a target storage tier from the set of storage tiers based on a utilization measure of the log structure; and
   after identifying the plurality of extents to reclaim and performing the tier selection operation, storing data from the identified extents into a new extent of the target storage tier and freeing the identified extents,
   wherein performing the tier selection operation to select the target storage tier includes:
      choosing, as the target storage tier, one of the first storage tier and a second storage tier that is different from the first storage tier, based on a utilization measure of the first storage tier, the utilization measure of the first storage tier being different from the utilization measure of the log structure.

2. A computer-implemented method as in claim 1 wherein the utilization measure of the first storage tier is a fullness value that quantifies a degree of fullness of the first storage tier; and
   wherein choosing, as the target storage tier, one of the first storage tier and the second storage tier includes:
      performing a comparison operation between (i) the fullness value that quantifies the degree of fullness of the first storage tier and (ii) a predefined threshold,
      selecting the first storage tier as the target storage tier when the fullness value is less than the predefined threshold, and the second storage tier as the target storage tier when the fullness value is greater than the predefined threshold.

3. A computer-implemented method as in claim 2 wherein the first storage tier includes a set of first storage devices providing first data access times; and
   wherein the second storage tier includes a set of second storage devices providing second data access times that are slower than the first data access times.

4. A computer-implemented method as in claim 1 wherein identifying the plurality of extents to reclaim includes:
   identifying, as the plurality of extents to reclaim, storage segments of the first storage tier which are less than 100 percent utilized.

5. A computer-implemented method as in claim 4 wherein identifying the storage segments of the first storage tier which are less than 100 percent utilized includes:
   picking, as the storage segments of the first storage tier which are less than 100 percent utilized, storage segments of the first storage tier which are less than 50 percent utilized and least recently accessed among other storage segments of the first storage tier.

6. A computer-implemented method as in claim 5 wherein a cleaning matrix structure classifies each storage segment of the first storage tier based on utilization and how long ago that storage segment was accessed relative to other storage segments of the first storage tier; and
   wherein picking the storage segments of the first storage tier which are less than 50 percent utilized and least recently accessed includes accessing the cleaning matrix structure to pick the storage segments of the first storage tier which are less than 50 percent utilized and least recently accessed.

7. A computer-implemented method as in claim 1 wherein the first storage tier includes a set of first storage devices providing first data access times;
   wherein the second storage tier includes a set of second storage devices providing second data access times that are slower than the first data access times; and
   wherein storing data from the identified extents into the new extent of the target storage tier includes copying the data from storage segments of the set of first storage devices to a free storage segment of the set of second storage devices providing the second data access times that are slower than the first data access times.

8. A computer-implemented method as in claim 1 wherein the first storage tier includes a set of first storage devices providing first data access times;
   wherein the second storage tier includes a set of second storage devices providing second data access times that are faster than the first data access times; and
   wherein storing data from the identified extents into the new extent of the target storage tier includes copying the data from storage segments of the set of first storage devices to a free storage segment of the set of second storage devices providing the second data access times that are faster than the first data access times.

9. A computer-implemented method as in claim 1 wherein the log structure is constructed and arranged to store host data on behalf of a set of host computers; and wherein storing the data from the identified extents into the new extent of the target storage tier and freeing the identified extents are performed as a background service which is secondary to a primary service of writing host data into and reading host data from the log structure on behalf of the set of host computers.

10. A computer program product having a non-transitory computer readable medium which stores a set of instructions to clean a log structure, the set of instructions, when carried out by computerized circuitry, causing the computerized circuitry to perform a method of:

identifying a plurality of used extents to reclaim for reuse from a first storage tier of a set of storage tiers containing the log structure;

performing a tier selection operation to select a target storage tier from the set of storage tiers based on a utilization measure of the log structure; and after identifying the plurality of used extents to reclaim and performing the tier selection operation, storing data from the identified used extents into a new extent of the target storage tier and freeing the used identified extents for reuse, wherein performing the tier selection operation to select the target storage tier includes:

choosing, as the target storage tier, one of the first storage tier and a second storage tier that is different from the first storage tier, based on a utilization measure of the first storage tier, the utilization measure of the first storage tier being different from the utilization measure of the log structure.

11. A computer program product as in claim 10 wherein choosing includes:

selecting, as the target storage tier, the second storage tier based on a fullness value that quantifies a degree of fullness of the first storage tier;

wherein the first storage tier includes a set of first storage devices providing first data access times; and wherein the second storage tier includes a set of second storage devices providing second data access times that are slower than the first data access times.

12. A computer program product as in claim 11 wherein identifying the plurality of used extents to reclaim for reuse includes:

picking storage segments of the first storage tier which are less than 50 percent utilized and least recently accessed.

13. A computer program product as in claim 12 wherein a cleaning matrix structure classifies each storage segment of the first storage tier based on utilization and how long ago that storage segment was accessed relative to other storage segments of the first storage tier; and wherein picking the storage segments of the first storage tier which are less than 50 percent utilized and least recently accessed includes accessing the cleaning matrix structure to pick the storage segments of the first storage tier which are less than 50 percent utilized and least recently accessed.

14. A computer program product as in claim 13 wherein the log structure is constructed and arranged to store host data on behalf of a set of host computers; and wherein storing the data from the identified used extents into the new extent of the target storage tier and freeing the identified used extents are performed as a background service which is secondary to a primary service of writing host data into and reading host data from the log structure on behalf of the set of host computers.

15. Data storage equipment, comprising:

a set of storage tiers containing a log structure;

memory; and control circuitry coupled to the set of storage tiers and the memory, the memory storing instructions which, when carried out by the control circuitry, cause the control circuitry to:

identify a plurality of extents to reclaim from a first storage tier of the set of storage tiers containing the log structure;

perform a tier selection operation to select a target storage tier from the set of storage tiers based on a utilization measure of the log structure; and after identifying the plurality of extents to reclaim and performing the tier selection operation, store data from the identified extents into a new extent of the target storage tier and free the identified extents to clean the log structure, wherein the control circuitry, when performing the tier selection operation to select the target storage tier, is constructed and arranged to:

choose, as the target storage tier, one of the first storage tier and a second storage tier that is different from the first storage tier, based on a utilization measure of the first storage tier, the utilization measure of the first storage tier being different from the utilization measure of the log structure.

16. Data storage equipment as in claim 15 wherein the log structure is constructed and arranged to store host data on behalf of a set of host computers; and wherein the control circuitry stores the data from the identified extents into the new extent of the target storage tier and frees the identified extents are performed as a background service which is secondary to a primary service of writing host data into and reading host data from the log structure on behalf of the set of host computers.

17. Data storage equipment as in claim 16 wherein the control circuitry, when choosing, is constructed and arranged to:

select, as the target storage tier, the second storage tier based on a fullness value that quantifies a degree of fullness of the first storage tier;

wherein the first storage tier includes a set of first storage devices providing first data access times; and wherein the second storage tier includes a set of second storage devices providing second data access times that are slower than the first data access times.

18. Data storage equipment as in claim 17 wherein the control circuitry, when identifying the plurality of extents to reclaim, is constructed and arranged to:

pick storage segments of the first storage tier which are less than 50 percent utilized and least recently accessed.

19. Data storage equipment as in claim 18 wherein a cleaning matrix structure classifies each storage segment of the first storage tier based on utilization and how long ago that storage segment was accessed relative to other storage segments of the first storage tier; and wherein the control circuitry, when picking the storage segments of the first storage tier which are less than 50 percent utilized and least recently accessed, is constructed and arranged to:

access the cleaning matrix structure to pick the storage segments of the first storage tier which are less than 50 percent utilized and least recently accessed among other storage segments of the first storage tier.

20. A computer-implemented method as in claim 1 wherein storing the data from the identified extents into a new extent includes:
reading first data from a first extent of the first storage tier,
reading second data from a second extent of the first storage tier, each device of the first storage tier providing a first data access speed, and,
writing the first data and the second data into a single target extent of the second storage tier, each device of the second storage tier providing a second data access speed that is different from the first data access speed.

21. A computer-implemented method as in claim 20 wherein reading the first data from the first extent of the first storage tier includes reading the first data from flash memory;
wherein reading the second data from the second extent of the first storage tier includes reading the second data from the flash memory; and
wherein writing the first data and the second data into the single target extent of the second storage tier includes coalescing the first data and the second data read from the flash memory into coalesced data and writing the coalesced data into magnetic-disk-based storage.

\* \* \* \* \*